United States Patent [19]
Roche

[11] 4,372,587
[45] Feb. 8, 1983

[54] ADAPTER FLANGE

[75] Inventor: Charles W. Roche, Northboro, Mass.

[73] Assignee: Uni-Flange Corporation, Northboro, Mass.

[21] Appl. No.: 263,710

[22] Filed: Apr. 14, 1981

Related U.S. Application Data

[63] Continuation of Ser. No. 97,352, Nov. 26, 1979, abandoned.

[51] Int. Cl.³ .............................................. F16L 47/00
[52] U.S. Cl. ...................................... 285/238; 285/342; 285/349; 285/368; 285/414
[58] Field of Search ............... 285/337, 368, 413, 414, 285/342, 343, 238, 349

[56] References Cited

U.S. PATENT DOCUMENTS

| | | | |
|---|---|---|---|
| 1,186,621 | 6/1916 | Townsend | 285/363 |
| 2,258,190 | 10/1941 | Neilson | 285/412 |
| 2,402,868 | 6/1946 | Boyle | 285/336 |
| 2,507,261 | 5/1950 | Mercier | 285/368 |
| 2,738,993 | 3/1956 | Wilson | 285/414 |
| 3,004,780 | 10/1961 | Main | 285/242 |
| 3,135,538 | 6/1964 | George | 285/363 |
| 3,627,357 | 12/1971 | Sanders | 285/343 |
| 4,183,560 | 1/1980 | Wyss | 285/368 |

FOREIGN PATENT DOCUMENTS

| | | | |
|---|---|---|---|
| 1420486 | 11/1965 | France | 285/368 |
| 107946 | 11/1963 | Netherlands | 285/238 |

Primary Examiner—Dave W. Arola
Attorney, Agent, or Firm—Blodgett & Blodgett

[57] ABSTRACT

Flange for attaching a pipe to a flanged member, the flange consisting of a split disc having matching bore halves which are provided with peripheral serrations.

2 Claims, 7 Drawing Figures

U.S. Patent  Feb. 8, 1983  4,372,587
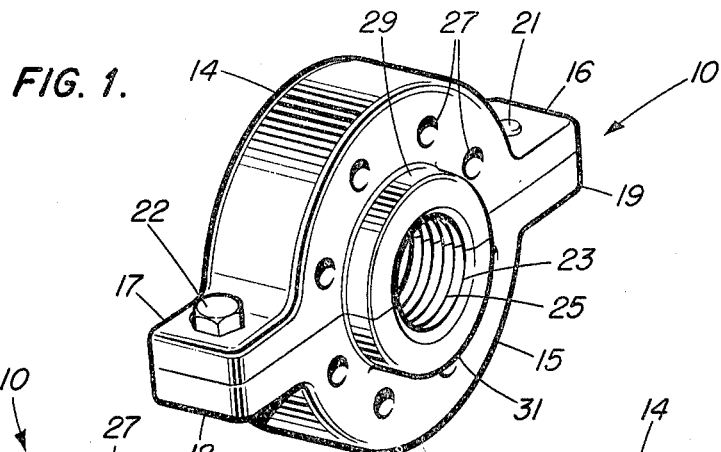
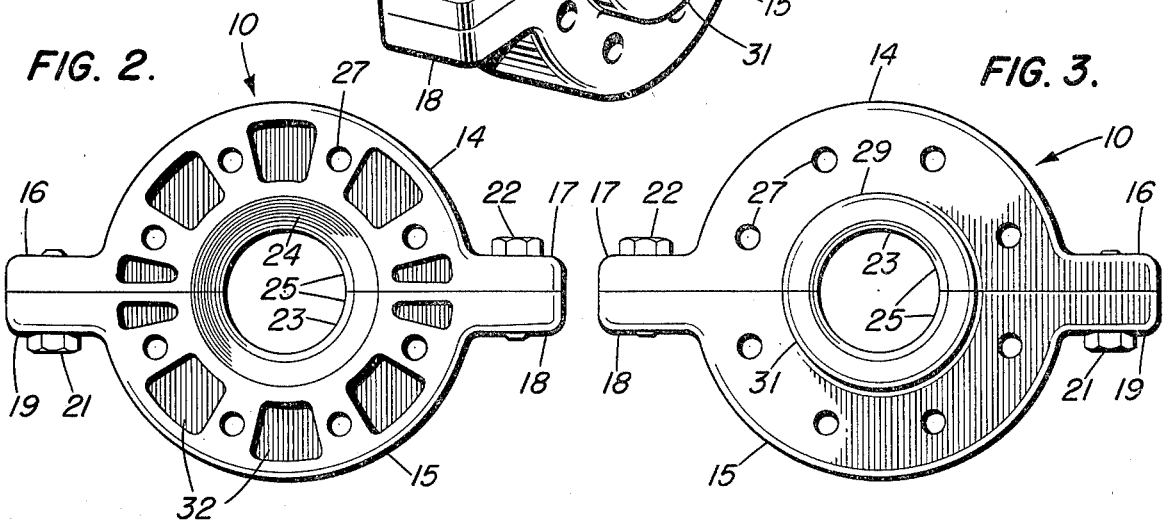
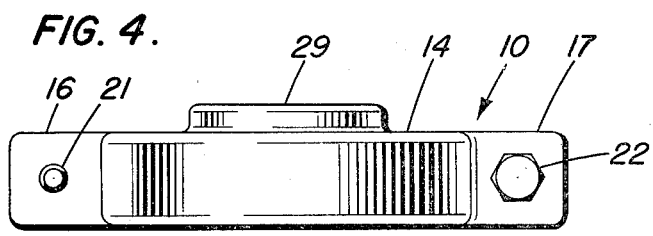
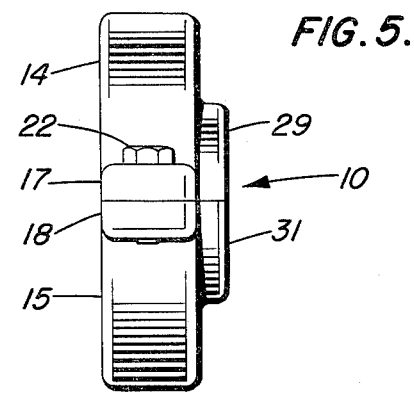
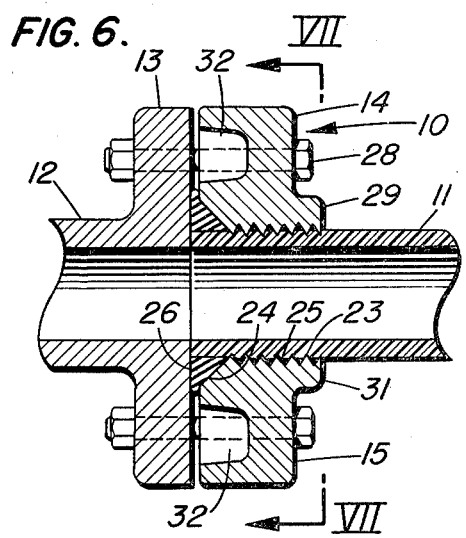
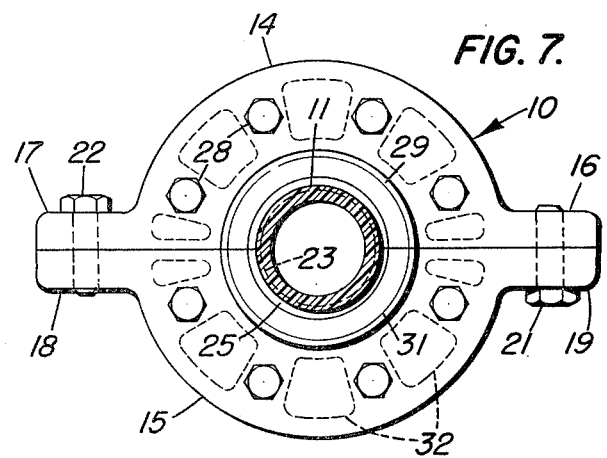

4,372,587

ADAPTER FLANGE

This is a continuation of application Ser. No. 97,352 filed Nov. 26, 1979 and now abandoned.

BACKGROUND OF THE INVENTION

There are many situations in which it is necessary to attach an unflanged pipe to a flanged member. Such a situation exists when a pipe is to be attached to a valve having an attaching flange. In the past, when the pipe has been made of steel or cast iron, it has been common practice to use threaded flanges, welded flanges, or a flange adapter having a bore which could slide smoothly over the end of the pipe. The adapter was disc-shaped and had a hub which carried radially-extending set screws that pressed down into the pipe to hold the flange in place. Once the flange had been attached to the pipe, the flange was then bolted to the flange of the valve. A flexible seal was inserted between the two flanges and the water-tight connection was complete. It is becoming common practice to use plastic pipe in many hydraulic installations and, in particular, polyvinlychloride (PVC) pipe has become popular. When one attempts to attach such a pipe to a flanged element, using the old flange adapter that has been described, the set screws distort the pipe and even pierce it on occasion. The distortion of the pipe can cause leakage through the space between the flange and the pipe and, under some circumstances the pipe will slide out of the flange because hydraulic pressure. These and other difficulties experienced with the prior art devices have been obviated in a novel manner by the present invention.

It is, therefore, an outstanding object of the present invention to provide a flange for attaching fragile pipe to a flanged element.

Another object of this invention is the provision of an adapter flange for use with pipe which is easily distorted.

A further object of the present invention is the provision of an adapter flange for use in attaching plastic pipe to a fiberglass pipe, or wall steel pipe to a flanged valve or the like.

It is another object of the instant invention to provide an adapter flange for use with soft pipe, which flange is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the present invention consists of an adapter flange for use in attaching a plastic pipe, fiberglass pipe or light weight steel pipe to a member having a flange. The adapter is provided with two similar main bodies of semi-circular shape, having laterally-extending arms adapted to be fastened together. The bodies define between them a bore having a diameter substantially equal to the diameter of the pipe and having a conical counter bore at one end. The surface of the bore is formed with a plurality of peripheral serrations adapted to grip the outer surface of the pipe. A resilient seal lies in the counterbore and is adapted to be compressed between the surface of the adapter and the flange of the member.

More specifically, each serration has a triangular cross-section providing a sharp edge for piercing the surface of the pipe. The height of the serrations and the diameter of the bore are selected so that, when the arms are drawn together, the serrations penetrate the pipe by an amount sufficient to prevent slippage of the flange on the pipe, but not sufficient to damage or weaken the pipe.

BRIEF DESCRIPTION OF THE DRAWINGS

The character of the invention, however, may be best understood by reference to one of its structural forms, as illustrated by the accompanying drawings, in which:

FIG. 1 is a perspective view of an adapter flange incorporating the principles of the present invention, FIG. 2 is a rear elevational view of the flange, FIG. 3 is a front elevational view of the flange, FIG. 4 is a plan view of the flange, FIG. 5 is a left-hand end view of the flange, FIG. 6 is a vertical sectional view of the flange showing it in use with a pipe and a flanged valve, and FIG. 7 is a sectional view taken on the line VII—VII of FIG. 6.

DESCRIPTION OF THE PREFERRED EMBODIMENT

Referring first to FIG. 1, wherein are best shown the general features of the invention, the adapter flange, indicated generally by the reference numeral 10, is shown as consisting of two similar bodies 14 and 15. The upper body 14 is provided with arms 16 and 17, while the lower body 15 is provided with similar arms 18 and 19. The two bodies have together a disc-like configuration and has an axial bore 23 whose surface is provided with peripheral serrations 25. The bodies are provided with bolt holes or bores 27 spaced on a standard center line circle. The main bodies 14 and 15 are provided with axially-extending arcuate protuberances 29 and 31, respectively, which define a hub extending from one side of the assembly.

Referring next to FIGS. 2-5, which show further details of the invention, FIG. 2 particularly shows the manner in which the bodies 14 and 15 are provided with pockets 32 located between the bolt holes or bores 27. Most of these pockets are of generally trapezoidal shape defined by two radial lines joined by concentric curved lines. One curve is adjacent the outer periphery of the body and the other is adjacent the bore 23. The pockets enter the side of the bodies opposite that occupied by the hub formed by the protuberances 29 and 31. It can be seen in FIG. 4 that the arms 16, 17, 18, and 19 are generally square in plan view and generally rectangular in elevation. A bolt 21 passes through the arm 19 and is threaded into the arm 16, while a bolt 22 extends through the arm 17 and is threaded into the arm 18.

FIGS. 6 and 7 show the manner in which the invention is used. The adapter flange 10 is shown in use in attaching a pipe 11 to a flange 13 of a member 12. In the illustration the pipe 11 is formed of plastic, such as PVC. The member 12 may be a valve or the like. In order to complete the assembly, the flange 10 is first mounted on the pipe 11 and then is bolted to the flange 14. In order to mount the flange on the pipe, the bolts 21 and 22 are loosened and the bodies 14 and 15 are separated by a small amount. The pipe is inserted between them in the bore 23 with its end flush with the face of the flange that has the counterbore 24. The bolts 21 and 22 are then tightened up drawing the two bodies 14 and 15 together. When this is done, the serrations 25 bite into the material of the pipe to a limited extent. The amount of serrations that enter and form corresponding mating grooves in the pipe is predetermined, so that it is adequate to restrain movement of the flange axially along the pipe when it is later fastened to the flange 13. When the bolts 21 and 22 have been drawn up completely, the seal 26 is inserted in place in the counterbore 24. This seal is formed of an elastomer material, such as Buna, and conforms in general to the shape of the counterbore. The unit formed by the pipe 11 and the flange 10 is then inserted against the face of the flange 13 of the member 12 and the bolts 28 (with their corresponding nuts) are placed in the bolt holes or bores 27. As the bolts are tightened, the seal 26 is distorted and presses not only against the surface of the pipe 11, but also against the face of the flange 13 as well as the surface of the counterbore 24, thus preventing escape of liquid even under considerable pressure.

The advantages of the present invention will now be clearly understood in view of the above description. The biting of the serrations 23 into the material of the pipe 11 allows for distortion of the surface of the pipe into the spaces between serrations to form mating surfaces, but this takes place without changing the general shape of the pipe or the shape of its interior. In other words, the pipe is not changed in such a way as to change the flow of fluid through its bore. The biting of the threads into the material of the pipe allows the flange 10 to be clamped tightly against the flange 13 and to compress the seal 26 without slippage on the pipe 11. The provision of the pockets 32 lightens the entire structure, so that its use does not unduly add to the weight of the elements in the combination.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Adapter flange for attaching a plastic pipe to a member having a flange, comprising:
   (a) two similar main bodies of semi-circular shape, having laterally-extending arms adapted to be fastened together, the bodies defining between them a central bore having a diameter substantially equal to the diameter of the pipe, a conical counterbore at one of said central bore, and a plurality of axial peripheral bores to receive bolts fastening them to the said flange of the member, the surface of the central bore being formed with a plurality of annular serrations, the cross-section of each serration having a triangular shape formed by two sides which are oblique to the surface of the pipe and which intersect to form a shape edge for piercing the surface of the pipe, the two sides being on opposite sides of a plane which is perpendicular to the surface of the pipe and which extends through said sharp edge, each serration having a height relative to the outer diameter of the pipe such that, when the main bodies are fastened together, the serrations penetrate the pipe an amount sufficient to prevent slippage of the main bodies on the pipe, but not sufficient to damage or weaken the pipe, each of said main bodies being generally defined by two spaced, parallel faces and a cylindrical surface of semi-circular cross-section, each of said main bodies being provided with pockets that open onto one of the faces and are located between the said peripheral bores,
   (b) a resilient seal adapted to extend into said counterbore and to be compressed between the surface of the main bodies and the flange of the member, and
   (c) a protuberance on each of said bodies that form an axially-extending hub.

2. Adapter flange for attaching a plastic pipe to a member having a flange, comprising:
   (a) two similar main bodies of semi-circular shape, having laterally-extending arms adapted to be fastened together, the bodies defining between them a central bore having a diameter substantially equal to the diameter of the pipe, a conical counterbore at one end of said central bore, and a plurality of axial peripheral bores to receive bolts fastening them to the said flange of the member, the surface of the central bore being formed with a plurality of annular serrations, the cross-section of each serration having a triangular shape formed by two sides which are oblique to the surface of the pipe and which intersect to form a sharp edge for piercing the surface of the pipe, the two sides being on opposite sides of a plane which is perpendicular to the surface of the pipe and which extends through said sharp edge, each serration having a height relative to the outer diameter of the pipe such that, when the main bodies are fastened together, the serrations penetrate the pipe an amount sufficient to prevent slippage of the main bodies on the pipe, but not sufficient to damage or weaken the pipe, each of said main bodies being generally defined by two spaced, parallel faces and a cylindrical surface of semi-cylindrical surface of semi-circular cross-section, each of said main bodies being provided with pockets that open onto one of the faces and are located between the said peripheral bores, and
   (b) a resilient seal adapted to extend into said counterbore and to be compressed between the surface of the main bodies and the flange of the member.

* * * * *